United States Patent
Belmonte et al.

(10) Patent No.: US 9,944,382 B2
(45) Date of Patent: Apr. 17, 2018

(54) TIGHTENING AND OIL DISCHARGING NUT, AND A TURBINE ENGINE

(71) Applicant: SNECMA, Paris (FR)

(72) Inventors: Olivier Belmonte, Moissy-Cramayel (FR); Emmanuel Pierre Dimitri Patsouris, Moissy-Cramayel (FR)

(73) Assignee: SNECMA, Paris (FR)

( * ) Notice: Subject to any disclaimer, the term of this patent is extended or adjusted under 35 U.S.C. 154(b) by 709 days.

(21) Appl. No.: 14/489,635

(22) Filed: Sep. 18, 2014

(65) Prior Publication Data

US 2015/0078899 A1 Mar. 19, 2015

(30) Foreign Application Priority Data

Sep. 18, 2013 (FR) ...................... 13 58982

(51) Int. Cl.
| | | |
|---|---|---|
| *F01D 11/00* | (2006.01) | |
| *F01D 7/00* | (2006.01) | |
| *B64C 11/06* | (2006.01) | |
| *F16C 33/78* | (2006.01) | |
| *F16C 35/063* | (2006.01) | |

(52) U.S. Cl.
CPC .............. *B64C 11/06* (2013.01); *F16C 33/78* (2013.01); *F16C 35/063* (2013.01); *F16C 2360/23* (2013.01)

(58) Field of Classification Search
CPC .... B64C 11/06; F16C 2360/23; F16C 35/063; F16C 33/78
See application file for complete search history.

(56) References Cited

U.S. PATENT DOCUMENTS

| | | |
|---|---|---|
| 2002/0158418 A1 | 10/2002 | Thiesemann et al. |
| 2011/0223010 A1 | 9/2011 | Mundinger et al. |

FOREIGN PATENT DOCUMENTS

| | | | |
|---|---|---|---|
| EP | 2 192 272 A1 | 6/2010 | |
| FR | 2 944 557 A1 | 10/2010 | |
| GB | 564928 A | 10/1944 | |
| JP | 2003-56362 A | 2/2003 | |
| JP | 4797299 B2 | 10/2011 | |

OTHER PUBLICATIONS

French Preliminary Search Report dated May 14, 2014 in Patent Application No. 1358982 (with English translation of categories of cited documents).

*Primary Examiner* — John C Hong
(74) *Attorney, Agent, or Firm* — Oblon, McClelland, Maier & Neustadt, L.L.P.

(57) ABSTRACT

A device for controlling the pitch of the blades of a rotor is provided. The device includes a radial shaft, the rotation of which controls the pitch of the blades; a guiding bearing for guiding the radial shaft; a nut which tightens the guiding bearing along the radial axis; and a circumferential rib extending as a protrusion towards the outside of the nut, for guiding a lubrication oil towards the outside of the nut.

8 Claims, 2 Drawing Sheets

TIGHTENING AND OIL DISCHARGING NUT, AND A TURBINE ENGINE

FIELD OF THE INVENTION

The invention relates to a device for controlling the pitch of the blades of a rotor, which prevent from lubrication oil leaks. It also relates to a turbine engine comprising such a device.

PRESENTATION OF THE PRIOR ART

Turbine engine fans comprising at least one rotor and blades with variable pitch are known from the state of the art.

The geometrical pitch is the angle formed by the chord of the profile of the blade and the axis of rotation of the engine.

For this purpose, a device is known comprising a radial shaft 100 being bound to the blade by a pivot, the rotation of the radial shaft controlling the pitch of the blades (FIG. 1).

A guiding bearing 101 (roller bearings) is generally provided for guiding the rotation of the radial shaft.

At this level, the turbine engine comprises different enclosures. Thus, the turbine engine successively comprises, upon moving away from the engine axis: an enclosure 102 comprising oil (commonly called an oil chamber), an air enclosure 103, a pressurized enclosure 104 and finally the aerodynamic vein 105.

It is known that that the bearings are lubricated via oil.

Now, this oil tends to leak out from the bearings to the air enclosure.

Therefore, this oil should be prevented from reaching the pressurized enclosure, since it would risk reaching the aerodynamic vein 105 via the junctions 106 and catching fire.

PRESENTATION OF THE INVENTION

The invention proposes a device for controlling the pitch of the blades of a rotor, comprising:
  a radial shaft, the rotation of which controls the pitch of the blades,
  a bearing for guiding the radial shaft,
  characterized in that it comprises:
  a nut
    which tightens the guiding bearing along the radial axis, and
    comprising a second circumferential rib extending as a protrusion towards the outside of the nut, for guiding a lubrication oil from the bearing to the outside of the nut.

The invention is advantageously completed with the following features, taken alone or in any of their technically possible combination:
  the nut comprises a circumferential groove capped by the circumferential rib;
  the circumferential groove comprises one or more oil discharge holes for discharging oil out of the nut;
  the circumferential rib also extends as a protrusion towards the inside of the nut;
  the device comprising a circumferential cavity capped by the portion of the rib protruding towards the inside of the nut;
  the circumferential rib also extends as a protrusion towards the inside of the nut so as to cap the cavity, and the nut comprises one or more oil discharge holes facing the cavity, so as to ensure guiding of the oil from the cavity to the outside of the nut;
  the nut surrounds a radial shaft, and the portion of the rib protruding towards the inside of the nut caps a junction area between the radial shaft and the nut;
  the nut comprises a circumferential joint in contact with a ferrule supporting the guiding bearing and the portion of the rib protruding towards the outside of the nut caps a contact area between the circumferential joint and the ferrule.

The invention also relates to a turbine engine, comprising a rotor provided with variable pitch blades, and to a device for controlling the pitch of these blades, according to what has been described earlier.

According to an embodiment, the turbine engine comprises a first enclosure comprising air, a second pressurized enclosure, separated from the first enclosure by a ferrule having junction areas which may allow oil to pass from the first enclosure to the second enclosure, and in which the nut is configured for guiding the oil towards the first enclosure outside the junction areas.

The invention provides a simple and efficient solution for avoiding oil leaks towards the aerodynamic vein.

Further, the invention proposes a solution which ensures both maintenance of the bearing and discharge of the oil.

In particular, the solution does not require the addition of new parts.

The invention allows easy integration, not requiring any substantial modifications of the device for controlling the pitch of the blades.

Finally, the manufacturing of the device is simple and does not have any consequences on the time and costs for manufacturing the device for controlling the pitch of the blades.

PRESENTATION OF THE FIGURES

Other features and advantages of the invention will further become apparent from the following description, which is purely illustrative and non-limiting, and which should be read with reference to the appended drawings wherein.

DETAILED DESCRIPTION

Figure 1:
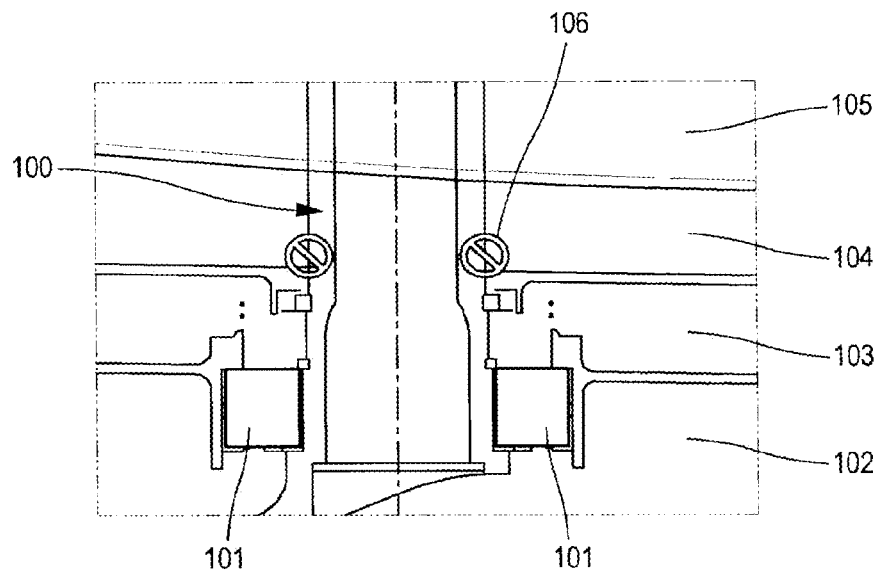
FIG. 1 is an illustration of a portion of a device for controlling the pitch of the blades according to the prior art.

An embodiment of a device 1 for controlling the pitch of the blades of a rotor is illustrated in FIG. 1. This device 1 may be installed in a turbine engine comprising a rotor for which the blades are with a variable pitch. For example, a turbine engine with a unducted fan and comprising two counter-rotating rotors may comprise such a device 1.

The device 1 comprises a radial shaft 2, the rotation of which around its own axis controls the pitch of the blades. The radial axis 18 is the axis which extends radially relatively to the longitudinal axis 19 of the turbine engine, the rotor rotating around said longitudinal axis 19.

The device 1 further comprises a guiding bearing 5 for guiding the radial shaft 2. This bearing 5 is of the type with roller bearings and gives the possibility of supporting and guiding the rotation of the radial shaft 2.

Conventionally, the blades of the rotor are subject to two rotations: one around their own axis, in order to adjust their pitch, and the other around the longitudinal axis 19 of the turbine engine.

As stated earlier, the guiding bearing 5 is lubricated with oil. The turbine engine in which the device 1 is installed comprises a first enclosure 27 comprising air, and a second pressurized enclosure 28, separated from the first enclosure 27 by a ferrule 29. Junction areas 32 present between the ferrule 29 and the radial shaft 2, may allow oil to pass from the first enclosure 27 to the second enclosure 28, which should be avoided.

The device 1 further comprises a nut 7. This nut 7 is for example axisymmetrical and comprises in its center a threaded passage 31. The threaded passage 31 allows the nut 7 to be engaged onto the radial shaft 2.

The nut 7 will tighten the guiding bearing 5 along the radial axis 18, thereby avoiding a displacement of the bearing 5 along this axis 18.

The guiding bearing 5 bears against a shoulder 22 of the radial shaft 2, and against a ferrule 23 for supporting the guiding bearing 5 and another tightening nut 26.

The nut 7 thereby ensures a function for tightening the guiding bearing 5, in cooperation with other parts of the device 1.

Clamping claws 30 are provided on the circumference of the upper portion of the nut 7 in order to tighten it against the bearing 5. The claws 30 cooperate with an anti-rotation ring 33 provided on the radial shaft 2, in order to ensure stopping of the nut 7.

Figure 3:
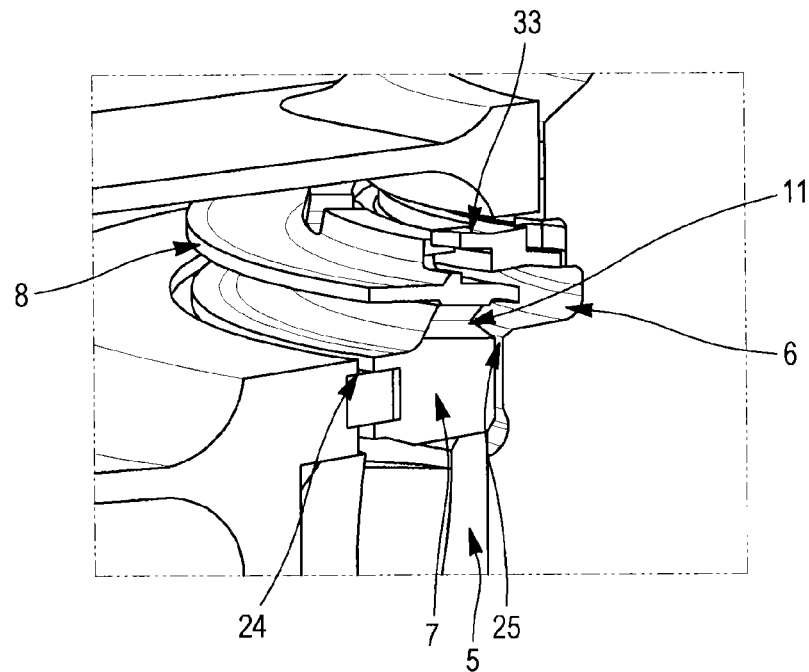
FIG. 3 is an illustration of a nut set into place in a device for controlling the pitch of the blades.
Figure 4:
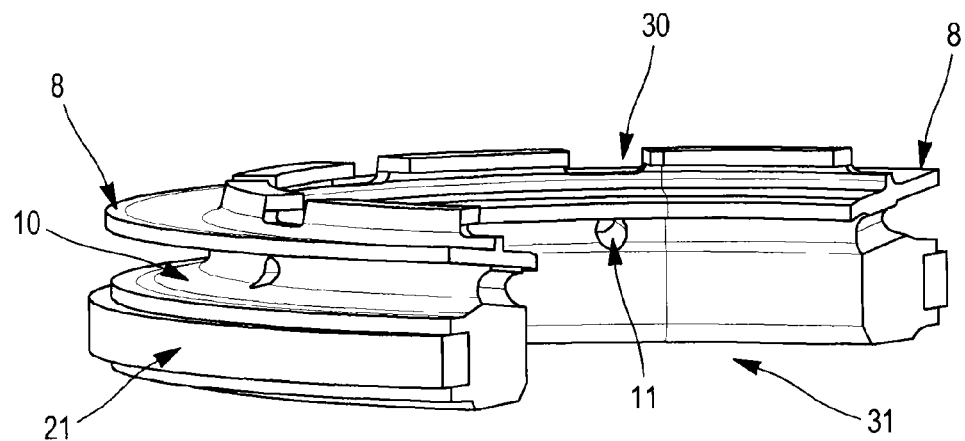
FIG. 4 is an illustration of this nut.

As illustrated in FIGS. 3 and 4, the nut 7 further comprises a circumferential rib 8 extending as a protrusion towards the outside of the nut 7. This rib 8 is therefore an orthogonal extension to the radial axis. The latter generally extends at the upper face of the nut 7 (the upper face of the nut 7 is the closest face to the blades).

This rib 8 assumes the shape of a cap which completes the nut 7.

The rib 8 gives the possibility of guiding the lubrication oil from the bearing 5 to the outside of the nut 7.

In particular, the rib 8 by its protruding extension prevents oil from returning to the nut 7, and in particular, prevents return of oil towards the junction areas 32 separating the first enclosure 27 from the second enclosure 28.

The lower face, along the radial axis, of the rib 8 forms a circumferential edge which prevents return of oil towards the nut 7 and the junction areas 32. It thus participates in the creation of a preferential path for guiding the oil out of the nut 7.

As detailed subsequently, the rib 8 gives the possibility of capping areas into which some oil may escape, in order to preferentially guide the oil out of the areas where the presence of oil is banned.

In particular, given that the nut 7 comprises a circumferential joint 21 in contact with the ferrule 23 supporting the guiding bearing 5, some oil may escape from the contact area 24 between the joint 21 and the ferrule 23. This oil risks attaining the junction areas 32 where the passage of oil is to be banned.

Now, the portion of the protruding rib 8 towards the outside of the nut 7 caps the contact area 24 between the ferrule 23 and the circumferential joint 21.

Thus, if some oil escapes from this contact area 24, it encounters the rib 8 which prevents it from continuing its travel towards the junction areas 32. The oil is then guided by the rib 8 preferentially towards the outside of the nut 7 (along the longitudinal axis) and may be discharged.

As illustrated in FIGS. 3 and 4, the nut 7 may comprise a circumferential groove 10 capped by the circumferential rib 8.

One or more oil discharge holes 11 are provided on the circumference of the nut 7, generally at the groove 10. These holes 11 allow oil to pass through the wall of the nut 7, from the inside of the nut 7 to the outside of the latter (along the longitudinal axis).

These holes 11 also participate in the creation of a preferential passage for the oil out of the nut 7 and of the junction areas 32.

Thus, according to an embodiment, the circumferential rib 8 also extends as a protrusion towards the inside of the nut 7.

This configuration allows the creation of a circumferential cavity 6 around the radial shaft 2. This cavity 6 is capped by the portion of the rib 8 protruding towards the inside of the nut 7.

Given that the nut 7 surrounds the radial shaft 2, junction areas 25 between the nut 7 and the radial shaft 2 may let through lubrication oil from the bearing 5. Now, these leaks are harmful, given that the junction areas 32 are located in close proximity to the junction areas 25, along the radial axis.

The nut 7 is configured so that the portion of the rib 8 protruding towards the inside of the nut 7 caps the junction area 25 between the radial shaft 2 and the nut 7. Thus, both the internal protruding portion and the external protruding portion of the rib 8 cap areas into which some oil may escape, in order to preferentially guide the oil out of the areas where the presence of oil is banned.

The oil tends to reach the cavity 6 but cannot escape along the radial axis because of the presence of the rib 8, which plays the role of a cap capping the cavity 6.

The holes 11 present on the circumferential groove 10 of the nut 7 are positioned facing the cavity 6. Thus, the oil is guided from the cavity 6 by the rib 8 towards the holes 11, and therefore towards the outside of the nut 7.

Figure 2:
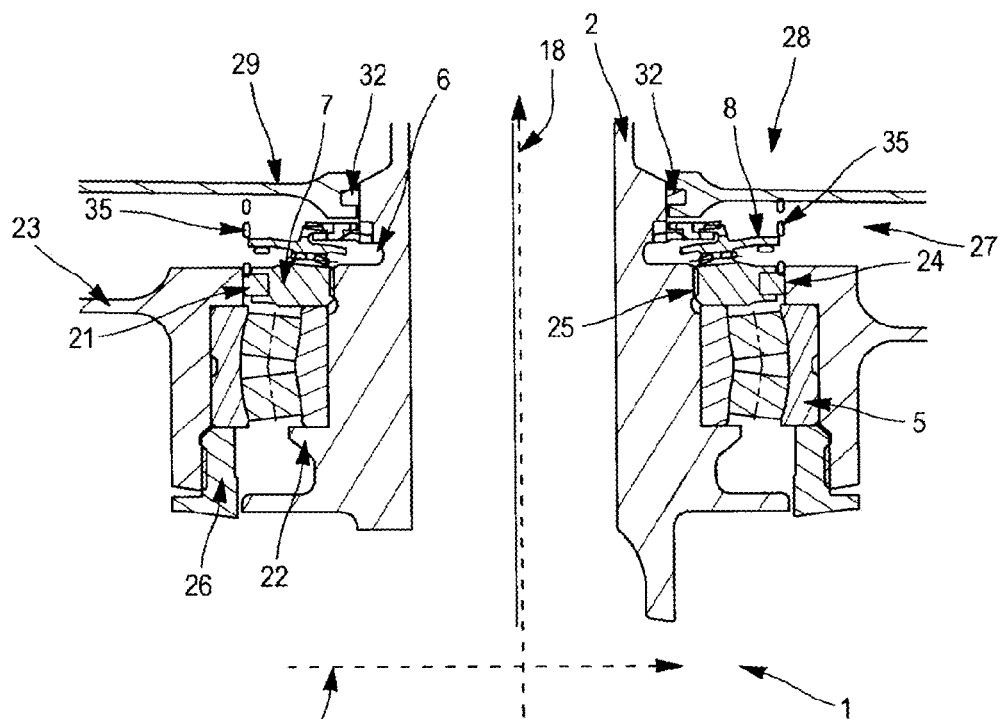
FIG. 2 is an illustration of a portion of an embodiment of a device for controlling the pitch of the blades according to the invention.

The oil then it encounters the external protruding rib portion 8, the lower face of which defines an edge which guides the oil towards the outside of the nut 7 and prevents it from flowing back towards the nut 7, and in particular towards the junction areas 32 (see the path 35 of the oil in FIG. 2).

The nut 7 therefore gives the possibility of guiding the oil towards the first enclosure 27 out of the junction areas 32. The oil may then be recovered for reuse in the turbine engine.

The nut 7 may be made by casting. Alternatively, by machining a standard nut 7, it is possible to generate the rib 8, the groove 10 as well as the holes 11.

It is noted that generally, a drop launching device gives the possibility of launching drops in a radial direction relatively to its rotation, while the axis of the nut 7 is orthogonal to the axis of rotation of the blades (the nut 7 belongs to the mobile portion of the turbine engine, the main axis of rotation of which is the longitudinal axis 19).

As this may be seen, the invention provides a simple and efficient solution for avoiding oil leaks towards the aerodynamic vein.

The nut gives the possibility via a single part of ensuring both tightening of the bearing and discharge of oil. The integration of the nut is easy and does not require substantial modifications of the device for controlling the pitch of the blades.

The invention claimed is:

1. A device for controlling a pitch of blades of a rotor, comprising:
   a radial shaft, wherein rotation of said radial shaft controls the pitch of the blades,
   a guiding bearing, for guiding the radial shaft,
   a nut configured to tighten the guiding bearing along a radial axis,
   a circumferential rib extending as a protrusion towards an outside of the nut, for guiding a lubrication oil of the guiding bearing towards the outside of the nut, and
   a circumferential groove capped by the circumferential rib, said circumferential groove comprising one or more oil discharge holes, for discharging oil out of the nut.

2. The device according to claim 1, wherein the circumferential rib extends as a protrusion towards an inside of the nut.

3. The device according to claim 2, comprising a circumferential cavity capped by a portion of the rib protruding towards the inside of the nut.

4. The device according to claim 3, wherein:
   the circumferential rib extends as a protrusion towards the inside of the nut so as to cap the cavity, and
   the nut comprises one or more oil discharge holes facing the cavity,
   so as to ensure guiding of the oil from the cavity towards the outside of the nut.

5. The device according to claim 1, wherein:
   the nut surrounds the radial shaft, and
   a portion of the rib protruding towards an inside of the nut caps a junction area between the radial shaft and the nut.

6. The device according to claim 1, wherein:
   the nut comprises a circumferential joint in contact with a ferrule supporting the guiding bearing, and
   a portion of the rib protruding towards the outside of the nut caps a contact area between the ferrule and the circumferential joint of the nut.

7. A turbine engine, comprising:
   a rotor, comprising blades with variable pitch;
   a device for controlling the pitch of the blades, according to claim 1.

8. The turbine engine according to claim 7, further comprising:
   a first enclosure comprising air, and
   a second pressurized enclosure, separated from the first enclosure by a ferrule having junction areas configured to allow oil to pass from the first enclosure to the second enclosure,
   wherein:
   the nut is configured for guiding the oil towards the first enclosure out of the junction areas.

* * * * *